March 27, 1934.  K. W. MAYHEW ET AL  1,952,880
AUTOMOBILE SPRING SEAT
Filed Oct. 1, 1930   2 Sheets-Sheet 1

Inventors
Kenneth W. Mayhew,
Melville E. Holloway,
Barton A. Bean Jr. Attorney

March 27, 1934.  K. W. MAYHEW ET AL  1,952,880
AUTOMOBILE SPRING SEAT
Filed Oct. 1, 1930    2 Sheets-Sheet 2
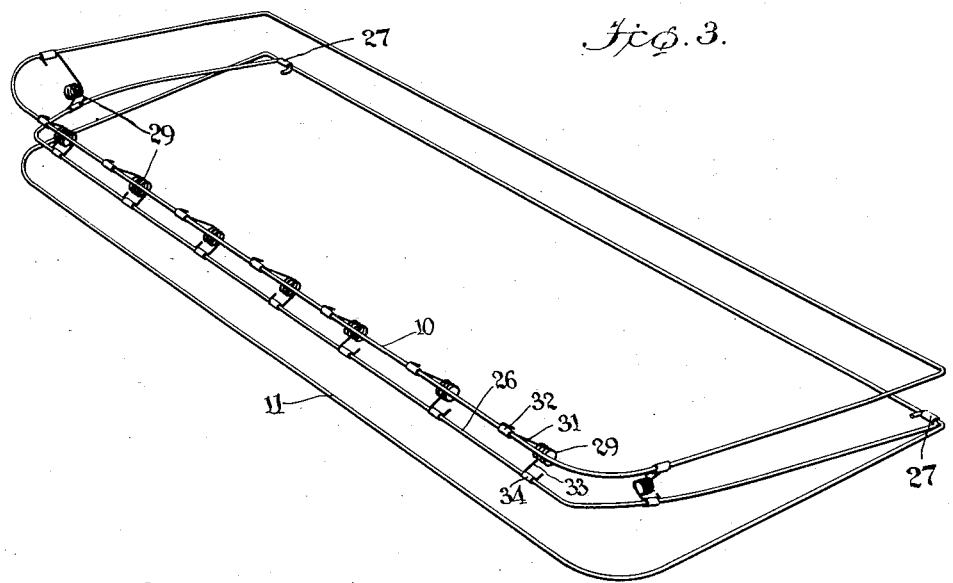
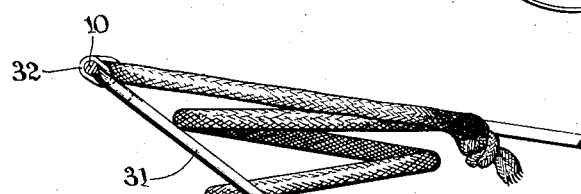
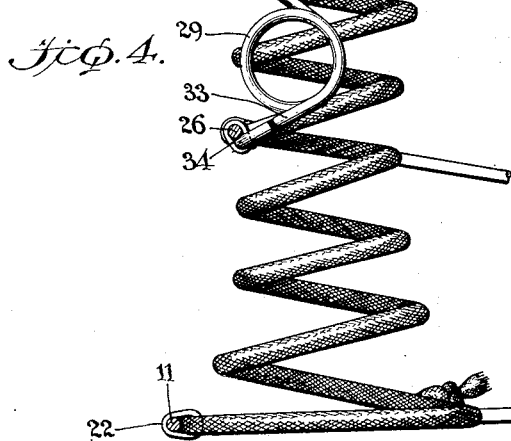
Inventors
Kenneth W. Mayhew,
Melville E. Holloway,
By Barton A. Bean Jr.
Attorney Patented Mar. 27, 1934

1,952,880

UNITED STATES PATENT OFFICE 1,952,880

AUTOMOBILE SPRING SEAT

Kenneth W. Mayhew, Angelica, and Melville E. Holloway, Hamburg, N. Y., assignors to F. R. Atkinson Spring Co., Hamburg, N. Y.

Application October 1, 1930, Serial No. 485,816

7 Claims. (Cl. 155—179)

This invention relates to a spring frame construction for seat cushions and particularly for such seat cushions as are employed in automotive vehicles.

Automobile seat cushions customarily comprise a wire framework defining the general outline of the cushion and upon which are mounted a plurality of vertically disposed helical springs over which suitable padding and a covering of cloth or leather is secured to complete the cushion. In order to prevent flexure or folding of the springs or cover fabric at the front of the seat cushion from pinching persons seated on the cushion and to otherwise render the seat more comfortable, it is customary to overhang or extend the upper portion of the seat beyond the lower portion. Because of such overhanging, the front portions of the cushions have been structurally weaker than the rearward parts and are likely to sag or become permanently distorted in continued use, and the springs in the front portion being likewise distorted become unable to function properly, rendering the seat uncomfortable and unattractive in appearance. The helical springs in the seat, when in use, are under substantially constant flexure, due to uneven road conditions and engine vibration, which may set up noise-producing vibrations in the springs and framework. These vibrations may be transmitted from one to other parts of the cushion assembly by the metal to metal contact of the spring and frame, this contact also resulting at times in squeaking upon small relative movements of the contacting parts.

The present invention contemplates a spring seat cushion construction in which the overhung portion of the frame is supported by resilient means backed by a thrust distributing member for distributing stresses, which are imposed upon and normally tend to sag the front portion of the assembly, to the various helical springs in such manner that sagging or permanent distortion is substantially prevented and the life of the cushion accordingly extended. Means are also provided for dampening noises caused by flexing of the cushion, this means consisting of a loose fitting and flexible woven fabric cover which completely encases the wire of each of the vertically disposed helical springs. This fabric, woven into tubular form and threaded over the springs in any desired manner as that described in copending application Serial No. 485,815 filed of even date herewith, is light in weight and has great flexibility and should not be confused with other spring coverings which have been fitted closely about spring wire and were therefore less flexible and less able to absorb noises set up by vibrations of the encased spring. The spring covers of the present invention, functioning to dampen noise-producing vibrations of the spring, further serve as sound absorbing insulation between the contacting spring and frame parts, thereby eliminating metal to metal contact of the parts and the consequent squeaking, and preventing the transmission of vibrations of one to other parts of the assembly.

These and other objects and advantages will become apparent from a perusal of the following description of a typical construction embodying the principles of the invention, reference being made to the accompanying drawings, wherein:—

Fig. 3 is a perspective view of the spring wire supporting frame of the spring assembly;

Fig. 4 is an enlarged vertical sectional view taken through the front of the structure shown in Fig. 1, certain parts being eliminated for clarity of the showing; and Fig. 5 is a fragmentary perspective view illustrating a portion of one of the fabric covered helical springs.

Figure 1:
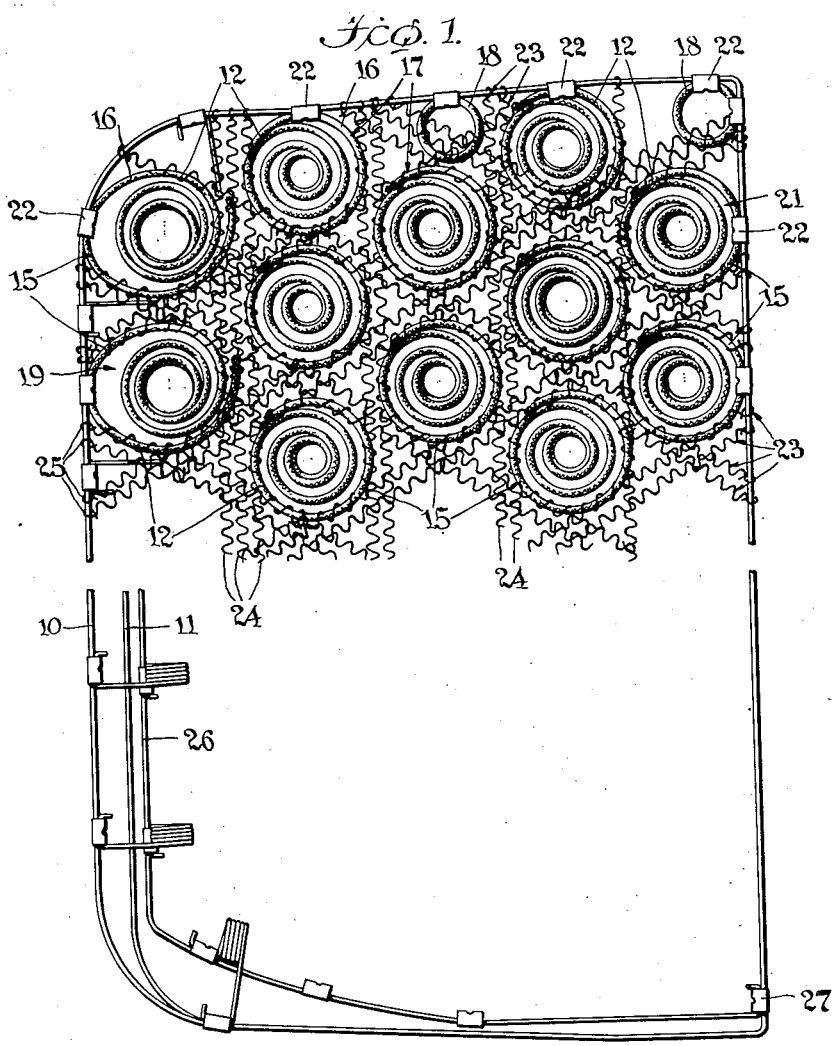
Fig. 1 is a broken plan view of the spring seat assembly, portions thereof being removed to clearly show the arrangement of the remaining parts.

As shown in Fig. 1, the spring seat assembly includes upper and lower rectangular frames 10 and 11, respectively, which substantially outline the upper and lower surfaces of the completed structure and which are held in vertically spaced relationship by a plurality of vertical coiled springs 12, the upper frame being extended to overhang the lower frame at the forward and lateral edges. Each vertical spring comprises a central spring wire 13 preferably formed with looped ends 14, and a woven fabric cover 15, fitting loosely about the wire and adapted for deadening noises set up by flexure of the spring. The cover fabric is woven to tubular form and is slipped or telescoped over the entire length of wire in each spring, the ends of the fabric being knotted or otherwise sealed to completely encase the wire before the springs are mounted in the seat assembly. As the cover is very flexible and fits the spring wire loosely, flexure of the spring in use will not effect appreciable wear of the cover, and the wire end, being looped, will have no tendency to pierce the fabric and thus impair the sound deadening function of the covers.

Certain of these covered helical springs, designated at 16, of substantially concave cylindrical contour, are arranged in staggered rows 17 extending lengthwise of the assembly, the shorter of the staggered rows being filled with more closely coiled helical springs 18. The lengths of the springs in the rows preferably decrease from the front row 19 to the rear row 21 in order that the upper surface of the assembly may be downwardly and rearwardly inclined, although if desired the springs may all be of the same length. The upper and lower convolutions of the springs which are adjacent to the frame members 10 and 11 are securely attached to the frame by metal clips 22 which are clamped over the frame and the springs. The spring covers 15 space the clips from the spring wires 13, thereby eliminating noises which might otherwise be set up or transmitted by metal contact.

The interior helical spring 12 or those which are not directly attached to the frame members 10 and 11 are supported in the assembly by a series of spring tempered wires 23 which are strung in pairs and across and are substantially co-planar with the frame members. These wires comprise strands 24 extending lengthwise of the assembly, spacing the longitudinal rows of springs and attached to the side of the frame members, and intersecting diagonal strands 25 spacing the spring in each row and attached to the front and rear portions of the frame. The strands 24 and 25 are preferably coiled prior to assembly with the springs and are, during the assembly operation, wrapped or intertwined about the upper and lower convolution of the spring, as shown in Fig. 1, and stretched to proper tension. As the spring covers 15 are interposed between the wire strands and the spring wires 13, metal to metal contact with its attendant disadvantages is eliminated. The loosely woven cover fabric engaging the wires 23, will also function to deaden the noise-producing vibrations which might be otherwise set up in the wires.

Figure 2:
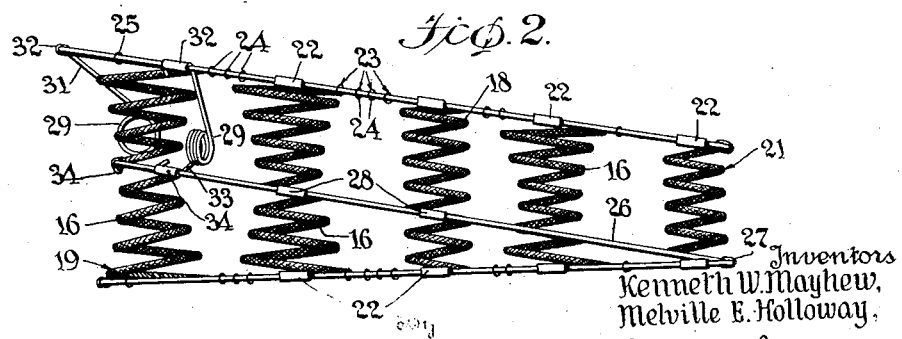
Fig. 2 is a side elevational view of the spring assembly shown in Fig. 1.

As shown in Figs. 1 and 2 the upper portions of the spring cushion overhang the lower portions by considerable distance at the front and front side edges. A great load is usually imposed upon these portions of the seat and to overcome or eliminate sagging or breaking down of such overhanging portion, a stress distributing frame member 26, of substantially U-shape, is provided. This member extends about the front and sides of the assembly and is secured to the rear portion of the lower frame member by means of clips 27 and to medial convolutions of the adjacent helical springs 12 by clips 28. Tightly coiled springs 29, having their axes in a substantially horizontal plane and having their end portions tangentially extended, are secured between the upper frame 10 and the distributing member 26, the upper tangential end extensions 31 being fastened by clips 32 to the member 10 and the lower end extensions 33 being attached to the member 26 by clips 34.

It will be understood that a load applied to the front of the frame member 10 will be resisted by the springs 29, backed by the stress distributing frame member 26 which will distribute the load to all of the vertical coiled springs to which it is attached by the clips 28. Any downward thrust of the upper frame member 10, through the upper extension arm 31 which is longer than the lower arm 33, exert a torsional stress upon the coiled portion of the spring 29 and will move this portion rearwardly producing an outward component of force on the member 10, preventing it from sagging inwardly. The inward component of force effective on the member 26 will be partially absorbed by the vertical coiled springs 12 to which the member is attached and the remainder transmitted to the lower frame 16 at its point of attachment to the member 26 at 27. The outward component of force applied to the member 10 will be absorbed by all of the springs 12, being distributed to them by the diagonal wire strands 24 and 25 and the clips 22.

As will be noted from an examination of the upper left of Fig. 1 and the upper center thereof, a pair of spaced wires 24 extend between each longitudinal row of vertical coil springs, each of the wires being coiled or inter-twined about the convolutions of the springs 12 adjacent to it, and the diagonal members 25 likewise comprise pairs of wires, each wire of the pairs being spaced from the other and inter-twined about the springs 12 of the diagonal rows of vertical springs adjacent to it. Between each set of three adjacent springs, the wires form a triangular seat for supporting the cushion padding, and any downward stresses exerted upon such triangular portion will tend to stretch the wires to urge them to creep relative to the coil springs. This creeping will be resisted by the engagement of the wires forming the triangle at each apex of the triangle. It will also be noted that another triangle is formed by the wires outwardly of the inner triangle and that the apices of this outer triangle are also joined by contacting wires and that the wires forming the inner triangle are joined to the wires forming the outer triangle at points spaced from the apices of the latter so that the wires 25 and 24 between each set of three vertical springs 12 contact and are thus joined at nine points to substantially reduce any tendency which they may have to creep when loads are imposed upon them. It will also be noted that any load applied to the triangular parts defined by the wires 25 and 24 will be applied tangentially to the convolutions to the springs 12 and will have a tendency to produce radial distortion of the springs.

It will now be understood that the present invention provides an improved spring seat construction, the salient features of which are silent operation, effected by the loosely woven fabric threaded over the vertical helical springs to eliminate metal to metal contact of the various parts of a the assembly and to dampen noise emitting vibrations which might otherwise be set up in the lacing springs 23, and the provision and arrangement of the thrust distributing member 26 and springs 29 for preventing undue sagging of the overhanging seat portion and for distributing the sag-producing forces to the various upright or vertical coiled springs 12.

It will be further understood that the spring seat construction herein described is merely exemplary of the principles of the invention which is intended to be of scope commensurate with the appended claims.

What is claimed is:

1. A spring seat construction comprising spaced upper and lower frame members, said upper frame member extending outwardly beyond said lower frame member, upright coiled springs of substantially concave cylindrical formation with the upper convolutions thereof of diameter greater than the medial convolutions thereof and disposed between said frame members, a stress distributing member connected to medial convolutions of a plurality of said upright springs, and a plurality of other springs having end portions connected respectively to said stress distributing member and to the extended portion of said upper frame member, said other springs resisting resiliently movement of the extended portion of the upper frame member toward the stress distributing member.

2. A spring seat construction comprising substantially rectangular upper and lower frame members, said upper frame member overhanging said lower frame member, upright coiled springs disposed between said frame members, means for connecting the upper and lower convolutions of said upright springs respectively to said upper and lower frame members, a stress distributing member connected to the medial portions of said upright springs, and a plurality of horizontally disposed coiled torsion springs having upwardly and downwardly inclined end portions respectively connected to the overhanging portion of said upper frame member and to said stress distributing member, said torsion springs resiliently resisting movement of the upper frame member toward the stress distributing member.

3. A spring seat construction comprising substantially rectangular upper and lower frame members, the front portion of said upper frame member overhanging the front portion of said lower frame member, upright coiled springs disposed between said frame members, means for connecting the upper and lower convolutions of said upright springs respectively to said upper and lower frame members, a stress distributing member having a front portion extending beneath the front portion of the upper frame member and having side portions connected to the rear portion of said lower frame member and extending between said upper and lower frame members, the front and the side portions of said stress distributing member being connected to the medial portions of certain of said upright springs, and springs connecting the front portion of said upper frame member and said stress distributing member for resisting movement of the upper frame member toward the stress distributing member.

4. A spring seat construction comprising substantially rectangular upper and lower frame members, said upper frame member overhanging the front portion of said lower frame member, upright coiled springs disposed between said frame members, said springs being covered with sound deadening covers, resilient wire members attached to the overhanging portion of said upper frame and secured to the upper convolutions of said upright coiled springs by twining thereabout, a stress distributing member extending beneath and inwardly of said overhanging portion of said upper frame and attached to certain of said covered upright springs, and springs connected to said stress distributing member and said overhanging portion of said upper frame member.

5. A wire framework for a spring cushion assembly, comprising substantially rectangular upper and lower wire loops, the forward side of the upper of said loops extending outwardly beyond said lower loop, a substantially U-shaped member secured at the ends thereof to the rear portion of said lower loop and extending between said loops and inwardly of the lower of said loops at the forward portions thereof, and a plurality of horizontally disposed coiled springs each having an elongated end extension connected to said upper loop and a short end extension connected to said member.

6. In a spring seat assembly, a row of upright helical springs each of generally concave cylindrical contour, a wire frame member extending longitudinally of said row of helical springs and tangentially connected to the upper convolutions of each of said upright springs, a stress distributing wire extending substantially parallel to said wire frame member and tangentially connected to a medial convolution of each of said upright springs, and a plurality of horizontally coiled springs disposed between said upright springs, each of said upright springs having ends extended tangentially therefrom connected to said frame member and said stress distributing member.

7. A spring for upholstery comprising a spring wire of helical form, said wire having loops formed on the ends thereof, and a tubular fabric member extending over said wire and following the convolutions thereof, the ends of the tubular fabric extending beyond the loops at the ends of the wire and being closed to completely encase the wire, said tubular fabric being of such form that it may be passed over the looped ends of the wire.

KENNETH W. MAYHEW.
MELVILLE E. HOLLOWAY.